United States Patent [19]
Genise

[11] Patent Number: 5,490,063
[45] Date of Patent: Feb. 6, 1996

[54] CONTROL METHOD/SYSTEM INCLUDING DETERMINATION OF AN UPDATED VALUE INDICATIVE OF GROSS COMBINATION WEIGHT OF VEHICLES

[75] Inventor: Thomas A. Genise, Dearborn, Mich.

[73] Assignee: Eaton Corporation, Cleveland, Ohio

[21] Appl. No.: 192,522

[22] Filed: Feb. 7, 1994

[51] Int. Cl.$^6$ .............................. G06F 19/00; F16H 59/48
[52] U.S. Cl. ....................... 364/424.1; 477/120; 477/124; 477/904; 477/35; 180/197; 180/248; 74/335; 192/103 C; 192/3.52; 192/3.58
[58] Field of Search ........................... 364/424.1, 426.01, 364/426.02, 426.03; 477/120, 124, 904, 35, 903, 129, 131; 180/197, 65.2, 243, 249, 248, 282; 74/335; 192/103 C, 3.52, 3.58

[56] References Cited

U.S. PATENT DOCUMENTS

| | | |
|---|---|---|
| 4,361,060 | 11/1982 | Smyth . |
| 4,595,986 | 7/1986 | Daubenspeck et al. ............. 364/424.1 |
| 4,648,290 | 3/1987 | Dunkley et al. ..................... 364/424.1 |
| 5,053,959 | 10/1991 | Genise ................................ 364/424.1 |
| 5,053,961 | 10/1991 | Genise ................................ 364/424.1 |
| 5,053,962 | 10/1991 | Genise ................................ 364/424.1 |
| 5,089,965 | 2/1992 | Braun ................................. 364/424.1 |
| 5,117,933 | 6/1992 | Sigl et al. ......................... 364/426.02 |
| 5,166,879 | 11/1992 | Greene et al. ....................... 364/424.1 |
| 5,168,955 | 12/1992 | Naito ................................ 364/426.03 |
| 5,272,939 | 12/1993 | Markyvech et al. ................ 364/424.1 |
| 5,301,768 | 4/1994 | Ishikawa et al. ................... 364/424.1 |
| 5,335,566 | 8/1994 | Genise et al. ...................... 364/424.1 |

Primary Examiner—Kevin J. Teska
Assistant Examiner—Jacques H. Louis-Jacques
Attorney, Agent, or Firm—Howard D. Gordon

[57] ABSTRACT

A control system/method for determining vehicular gross combined weight (GCW) is provided. GCW is determined immediately after upshifts of a transmission (10) and requires only input signals indicative of engine or driveline torque (DL), vehicle acceleration (dOS/dt) and currently engaged gear ratio (GR).

33 Claims, 6 Drawing Sheets

CONTROL METHOD/SYSTEM INCLUDING DETERMINATION OF AN UPDATED VALUE INDICATIVE OF GROSS COMBINATION WEIGHT OF VEHICLES

BACKGROUND OF THE INVENTION

RELATED APPLICATIONS

This application is related to U.S. Ser. No. 07/909,332, now U.S. Pat. No. 5,335,566, titled SHIFT CONTROL METHOD/SYSTEM, filed Jul. 6, 1992, and assigned to the same assignee, EATON CORPORATION, as this application.

1. Field of Invention

This invention relates to control methods and systems for determining vehicular gross combination weight (GCW), and to vehicular controls, such as anti-lock brake systems and transmission controllers utilizing current GCW as a control parameter. By way of example, the present invention relates to shift control methods/systems for automated mechanical transmissions wherein the likelihood of acceptably completing a selected upshift is evaluated in view of existing vehicle operating conditions, including GCW, and only acceptably completable shifts are initiated. An acceptably completable upshift is an upshift into a target ratio wherein, under existing vehicle operating conditions, the maximum available engine torque will cause at least a predetermined minimum vehicle acceleration. Current GCW also may be used for electronic braking systems, intelligent vehicle/highway systems, fleet management systems, etc.

This invention allows determination of GCW using existing information in an AMT system, preferably an AMT with an electronic engine, without adding any sensors or additional electronic or mechanical hardware.

2. Description of the Prior Art

Automated vehicular controls, such as fully or partially automatic transmission systems, both for heavy-duty vehicles, such as heavy-duty trucks, and for automobiles, that sense throttle openings or positions, transmission shaft speeds, vehicle speeds, engine speeds, and the like, and automatically shift the vehicle transmission in accordance therewith, are well known in the prior art. Examples of such transmission controls may be seen by reference to U.S. Pat. Nos. 3,961,546; 4,081,065; 4,361,060; 4,425,620; 4,631,679 and 4,648,290, the disclosures of which are incorporated herein by reference.

Another type of partially automated transmission system utilizes a semi-automatic shift implementation system/method for a mechanical transmission system for use in vehicles having a manually only controlled engine throttle means and/or a manually only controlled master clutch. The system usually has at least one mode of operation wherein the shifts to be semi-automatically implemented are automatically preselected. An electronic control unit (ECU) is provided for receiving input signals indicative of transmission input and output shaft speeds and for processing same in accordance with predetermined logic rules to determine (i) if synchronous conditions exist, and (ii) in the automatic preselection mode, if an upshift or downshift from the currently engaged ratio is required and to issue command output signals to a transmission actuator for shifting the transmission in accordance with the command output signals. Transmission systems of this general type may be seen by reference to U.S. Pat. Nos. 5,050,079; 5,053,959; 5,053,961; 5,053,962; 5,063,511; 5,081,588; 5,089,962; and 5,089,965, the disclosures of which are hereby incorporated by reference.

While the above-described automatic, semi-automatic and/or partial automatic shift implementation type vehicular mechanical transmission systems are well suited for their intended applications, they are not totally satisfactory as they will occasionally initiate an attempted shift, which, due to vehicle operating conditions, should not be completed. This is especially a concern for upshifts of automated mechanical transmission systems when the vehicle is operating against a particularly great resistance (usually associated with grade and/or load) and the engine, in the target ratio, is unable to accelerate or maintain vehicle velocity, which will result in undesirable "hunting" as the transmission undergoes cycles of upshifts followed by almost immediate downshifts.

It is known in the prior art to provide a shift control method/system for a vehicular at least partially automated mechanical transmission system which, upon sensing an automatic or manual selection of an upshift from a currently engaged gear ratio to a target gear ratio will, based upon currently sensed vehicle operating conditions and/or assumed constants, determine if the selected shift is feasible and acceptable (i.e., will the available engine torque applied to the drivewheels in the target ratio be sufficient to provide at least a predetermined minimum vehicle acceleration?) and initiate only feasible and acceptable shifts. Examples of such systems may be seen by reference to U.S. Pat. Nos. 5,241,476; 5,172,609; 4,823,646 and 5,272,939, the disclosures of which are incorporated herein by reference.

For vehicles of substantially constant GCW such as buses, mobile cranes, etc., assuming a vehicle equipped with an electronic data link, such as defined in SAE J 1922 and/or SAE J 1939 protocol, on which engine torque or a parameter indicative of engine torque may be sensed, upon determination that an upshift from a currently engaged ratio into a target ratio is desired, current engine torque and vehicle acceleration are sensed from which the controller can estimate the engine torque required, in the target ratio and at current vehicle operating conditions, to maintain the minimum acceptable vehicle acceleration. The system then proceeds to determine if the proposed shift is feasible/acceptable utilizing the logic discussed above. If the proposed shift (usually an upshift) is not acceptable, then the shift request may be modified (i.e., a skip shift request changed to single shift) or cancelled for a predetermined period of time (such as 10 seconds).

The prior art vehicular control systems utilizing GCW as a control parameter were not totally satisfactory, as a relatively simple and reliable method for determining current vehicular GCW for vehicles not having a substantially constant GCW was not provided. By way of example, a large truck or tractor-semitrailer vehicle may have a GCW ranging from about 10,000 pounds up to about 80,000 pounds or more, depending upon vehicle type and load.

SUMMARY OF THE INVENTION

In accordance with the present invention, the drawbacks of the prior art are minimized or overcome by the provision of a system/method for accurately determining current vehicular GCW. The system determines current vehicular GCW using information and sensors usually already provided in vehicles with fully or partially automated mechanical transmissions and, preferably, electronically controlled (SAE J 1922, J 1939 or similar protocol) engines.

The GCW of a vehicle may be determined from known drive train characteristics (transmission ratio, axle ratio, tire radius, etc.), torque at the drivewheels and vehicle acceleration measured at time $t_1$ and $t_2$ if $t_1$ and $t_2$ are relatively close (within seconds). This may be expressed as:

$$GCW=(T_1-T_2)\div((A_1-A_2)\times C)$$

where:

$T_i$=Wheel torque at time $t_i$;

$A_i$=Vehicle acceleration at time $t_i$; and

C=Wheel rolling radius÷gravity constant.

It was found in practice (while applying this theory in an actual vehicle) that the "farther away" in magnitude points 1 and 2 are from one another, the more accurate the calculation. For example, $T_1$ may be zero, which makes $A_1$ perhaps negative, while $T_2$ is rather large, making $A_2$ also relatively large and positive. However, from the assumptions made while deriving the function, points 1 and 2 cannot occur very far apart in time (four seconds was used in practice). To achieve this condition, the calculation is performed only during an upshift. More specifically, time point 1 is the instant during an upshift immediately before the transmission is shifted from neutral into the new gear. Time point 2 then may be any point after power is sufficiently reapplied after the shift for up to four seconds after time point 1.

According to the present invention, to minimize the effects of "noise" in the system, driveline torsionals, etc., it is desired to measure/determine wheel torque T and vehicle acceleration A at as widely separated points as possible, without being unduly separated by time (four seconds has been found to be a maximum time separation for determining GCW in a heavy-duty truck or tractor-semitrailer vehicle). It also is desirable to take a series of readings to maintain an average, preferably a mildly filtered average, value for GCW.

To accomplish the above, during an upshift, time to is taken as the moment just prior to engaging the new gear ratio, when $T_O$ will equal zero. Upon engagement of the new gear ratio and achieving a minimum vehicle acceleration, vehicle acceleration ($A_i$) and drivewheel torque ($T_i$) are measured at relatively short intervals (about 40 milliseconds) for a period of time not exceeding about four seconds, and each compared to the $t_O$ values to calculate a series of GCW values, which are then averaged by a mildly filtered running average technique.

Vehicle acceleration (A) is preferably determined as a function of the rate of change of transmission output shaft speed (dOS/dt), and drivewheel torque (T) is preferably determined from a reading of engine torque from the electronic engine data bus and factors such as transmission gear ratio, axle ratio and drive train efficiency. For non-electronically controlled engines, engine torque may be estimated from throttle position and known engine characteristics.

Accordingly, it is an object of the present invention to provide a relatively simple and reliable control system/method for determining current vehicular GCW requiring no additional sensors on vehicles equipped with an at least partially automated mechanical transmission and preferably an electronically controlled engine.

This and other objects and advantages of the present invention will become apparent from a reading of the detailed description of the preferred embodiment taken in connection with the attached drawings.

DESCRIPTION OF THE PREFERRED EMBODIMENT

Figures 1, 1A:
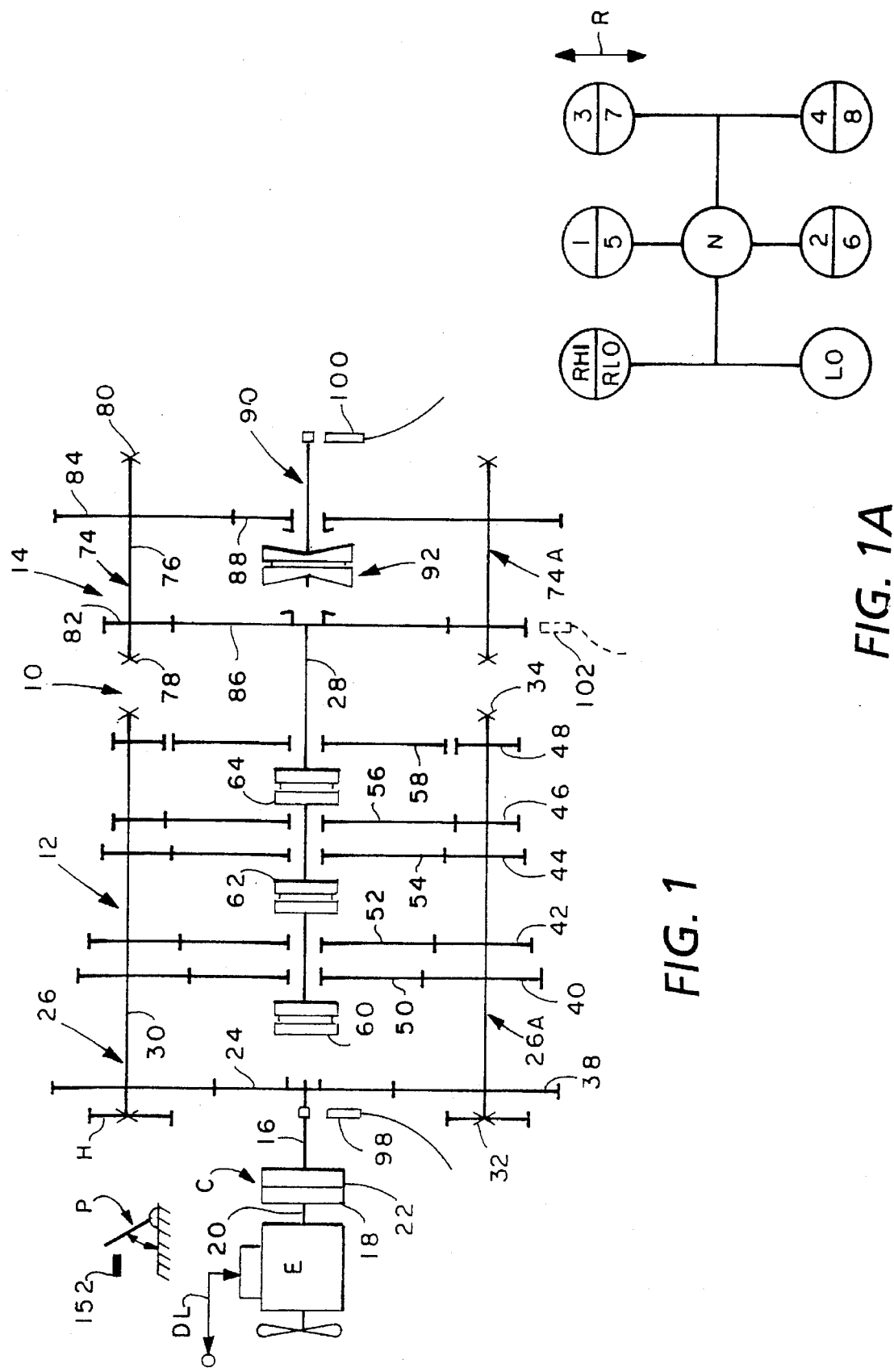
FIG. 1 is a schematic illustration of a vehicular mechanical transmission system partially automated by the system of the present invention.
FIG. 1A is a schematic illustration of the shift pattern of the transmission of FIG. 1.

Certain terminology will be used in the following description for convenience in reference only and will not be limiting. The words "upwardly," "downwardly," "rightwardly," and "leftwardly" will designate directions in the drawings to which reference is made. The words "forward" and "rearward" will refer respectively to the front and rear ends of the transmission as conventionally mounted in a vehicle, being respectfully from left and right sides of the transmission as illustrated in FIG. 1. The words "inwardly" and "outwardly" will refer to directions toward and away from, respectively, the geometric center of the device and designated parts thereof. Said terminology will include the words specifically mentioned above, derivatives thereof and words of similar import.

The term "compound transmission" is used to designate a change speed or change gear transmission having a multiple forward speed main transmission section and a multiple speed auxiliary transmission section connected in series whereby the selected gear reduction in the main transmission section may be compounded by further selected gear reduction in the auxiliary transmission section. "Synchronized clutch assembly" and words of similar import shall designate a clutch assembly utilized to nonrotatably couple a selected gear to a shaft by means of a positive clutch in which attempted engagement of said clutch is prevented until the members of the clutch are at substantially synchronous rotation. A relatively large capacity friction means are utilized with the clutch members and are sufficient, upon initiation of a clutch engagement, to cause the clutch members and all members rotating therewith to rotate at substantially synchronous speed.

The term "upshift" as used herein, shall mean the shifting from a lower speed gear ratio into a higher speed gear ratio. The term "downshift" as used herein, shall mean the shifting from a higher speed gear ratio to a lower speed gear ratio. The terms "low speed gear", "low gear" and/or "first gear" as used herein, shall all designate the gear ratio utilized for lowest forward speed operation in a transmission or transmission section, i.e., that set of gears having the highest ratio of reduction relative to the input shaft of the transmission. A "selected direction" of shifting will refer to selection of either single or multiple upshifting or downshifting from a particular gear ratio.

For purposes of illustration, the vehicular GCW determination method/system of the present invention is disclosed as associated with an upshift feasibility control for a partially automated mechanical transmission. It is understood that the determined vehicular GCW also may be advantageously utilized with other automated vehicular control systems.

Referring to FIG. 1, a range type compound transmission 10 of the type partially automated by a semi-automatic mechanical transmission system having an automatic preselect mode of operation is illustrated. Compound transmission 10 comprises a multiple speed main transmission section 12 connected in series with a range type auxiliary section 14. Transmission 10 is housed within a housing H and includes an input shaft 16 driven by a prime mover such as diesel engine E through a selectively disengaged, normally engaged friction master clutch C having an input or driving portion 18 drivingly connected to the engine crankshaft 20 and a driven portion 22 rotatably fixed to the transmission input shaft 16.

The engine E is fuel throttle controlled, preferably electronically, and is connected to an electronic data link DL of the type defined in SAE J 1922 and/or SAE J 1939 protocol, and the master clutch C is manually controlled by a clutch pedal (not shown) or the like. An input shaft brake (not shown), operated by manual overtravel depression of the clutch pedal, may be provided to provide quicker manual upshifting as is well known in the prior art.

Transmissions similar to mechanical transmission 10 are well known in the prior art and may be appreciated by reference to U.S. Pat. Nos. 3,105,395; 3,283,613 and 4,754,665, the disclosures of which are incorporated by reference.

Partially automated vehicular mechanical transmission systems of the type illustrated may be seen by reference to above-mentioned U.S. Pat. Nos. 5,050,079; 5,053,959; 5,053,961; 5,053,962; 5,063,511 and 5,089,965.

In main transmission section 12, the input shaft 16 carries an input gear 24 for simultaneously driving a plurality of substantially identical countershaft assemblies 26 and 26A at substantially identical rotational speeds. The two substantially identical countershaft assemblies are provided on diametrically opposite sides of mainshaft 28 which is generally coaxially aligned with the input shaft 16. Each of the countershaft assemblies comprises a countershaft 30 supported by bearings 32 and 34 in housing H, only a portion of which is schematically illustrated. Each of the countershafts is provided with an identical grouping of countershaft gears 38, 40, 42, 44, 46 and 48, fixed for rotation therewith. A plurality of mainshaft gears 50, 52, 54, 56 and 58 surround the mainshaft 28 and are selectively clutchable, one at a time, to the mainshaft 28 for rotation therewith by sliding clutch collars 60, 62 and 64 as is well known in the prior art. Clutch collar 60 may also be utilized to clutch input gear 24 to mainshaft 28 to provide a direct drive relationship between input shaft 16 and mainshaft 28.

Typically, clutch collars 60, 62 and 64 are axially positioned by means of shift forks associated with the shift housing assembly 70, as well known in the prior art. Clutch collars 60, 62 and 64 may be of the well known nonsynchronized double acting jaw clutch type.

Shift housing or actuator 70 is actuated by compressed fluid, such as compressed air, and is of the type automatically controllable by a control unit as may be seen by reference to U.S. Pat. Nos. 4,445,393; 4,555,959; 4,361,060; 4,722,237; 4,873,881; 4,928,544 and 2,931,237, the disclosures of which are incorporated by reference.

Mainshaft gear 58 is the reverse gear and is in continuous meshing engagement with countershaft gears 48 by means of conventional intermediate idler gears (not shown). It should also be noted that while main transmission section 12 does provide five selectable forward speed ratios, the lowest forward speed ratio, namely that provided by drivingly connecting mainshaft drive gear 56 to mainshaft 28, is often of such a high gear reduction it has to be considered a low or "creeper" gear which is utilized only for starting of a vehicle under severe conditions and, is not usually utilized in the high transmission range. Accordingly, while main transmission section 12 does provide five forward speeds, it is usually referred to as a "four plus one" main section as only four of the forward speeds are compounded by the auxiliary range transmission section 14 utilized therewith.

Jaw clutches 60, 62, and 64 are three-position clutches in that they may be positioned in the centered, nonengaged position as illustrated, or in a fully rightwardly engaged or fully leftwardly engaged position by means of actuator 70. As is well known, only one of the clutches 60, 62 and 64 is engageable at a given time and main section interlock means (not shown) may be provided to lock the other clutches in the neutral condition.

Auxiliary transmission range section 14 includes two substantially identical auxiliary countershaft assemblies 74 and 74A, each comprising an auxiliary countershaft 76 supported by bearings 78 and 80 in housing H and carrying two auxiliary section countershaft gears 82 and 84 for rotation therewith. Auxiliary countershaft gears 82 are constantly meshed with and support range/output gear 86 while auxiliary section countershaft gears 84 are constantly meshed with output gear 88.

A two-position synchronized jaw clutch assembly 92, which is axially positioned by means of a shift fork (not shown) and the range section shifting actuator assembly 96, is provided for clutching either gear 86 to output shaft 90 for direct or high range operation or gear 88 to output shaft 90 for low range operation of the compound transmission 10. The "shift pattern" for compound range type transmission 10 is schematically illustrated in FIG. 1A.

Range section actuator 96 may be of the type illustrated in U.S. Pat. Nos. 3,648,546; 4,440,037 and 4,614,126, the disclosures of which are hereby incorporated by reference.

For purposes of providing the automatic preselect mode of operation and the semi-automatic shift implementation operation of transmission 10, an input shaft speed sensor and an output shaft speed sensor 100 are utilized. Alternatively to output shaft speed sensor 100, a sensor 102 for sensing the rotational speed of auxiliary section countershaft gear 82 may be utilized. The rotational speed of gear 82 is, of course, a known function of the rotational speed of mainshaft 28 and, if clutch 92 is engaged in a known position, a function of the rotational speed of output shaft 90. As is well known (see above-mentioned U.S. Pat. No. 4,361,060), the signals (OS) from speed sensor 100 or other sensors may be differentiated with respect to time to provide signals (dOS/dt) having a value indicative of vehicle acceleration and the like. The ECU 106 will, preferably, include logic elements or rules for differentiating various input signals with respect to time.

Figure 2:
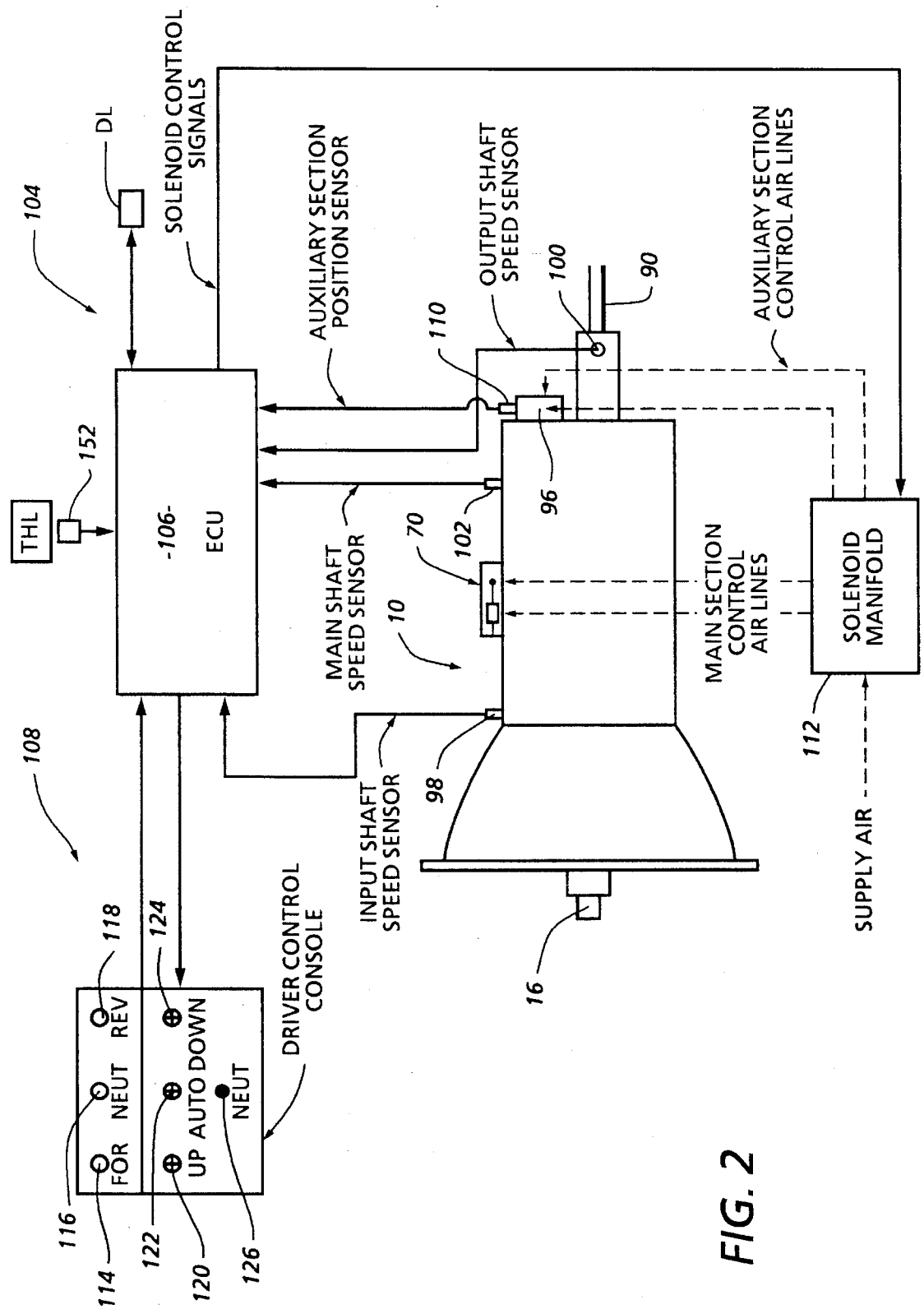
FIG. 2 is a schematic illustration of the semi-automatic shift implementation system for a mechanical transmission system of the present invention.

The automatic preselect and semi-automatic shift implementation control system 104 for a mechanical transmission system of the present invention is schematically illustrated in FIG. 2. Control system 104, in addition to the mechanical transmission 10 described above, includes an electronic control unit 106, preferably microprocessor based, for receiving input signals, from the input shaft speed sensor 98, from the output shaft speed sensor 100 (or, alternatively, the mainshaft speed sensor 102) and from the driver control console 108 from a throttle pedal P position sensor 152 and from the engine E though data link DL. The ECU 106 may also receive inputs from an auxiliary section position sensor 110.

The ECU 106 may be of the type illustrated in U.S. Pat. No. 4,595,986, the disclosure of which is incorporated herein by reference. The ECU is effective to process the inputs in accordance with predetermined logic rules to issue command output signals to a transmission operator, such as solenoid manifold 112 which controls the mainsection section actuator 70 and the auxiliary section actuator 96, and to the driver control console 108, and through the data link DL to engine E.

In the preferred embodiment, the driver control console allows the operator to manually select a shift in a given direction or to neutral from the currently engaged ratio, or to select a semi-automatic preselect mode of operation, and provides a display for informing the operator of the current mode of operation (automatic or manual preselection of shifting), the current transmission operation condition (forward, reverse or neutral) and of any ratio change or shift (upshift, downshift or shift to neutral) which has been preselected but not yet implemented.

Console 108 includes three indicator lights 114, 116 and 118 which will be lit to indicate that the transmission 10 is in a forward drive, neutral or reverse drive, respectively, condition. The console also includes three selectively lighted pushbuttons 120, 122, and 124 which allow the operator to select an upshift, automatic preselection mode or a downshift, respectively. A pushbutton 126 allows selection of a shift into neutral.

A selection is made by depressing or pushing any one of buttons 120, 122, 124 or 126 and may be cancelled (prior to execution in the case of buttons 120, 124 and 126) by redepressing the buttons. As an alternative, multiple depressions of buttons 120 and 124 may be used as commands for skip shifts. Of course, the buttons and lighted buttons can be replaced by other selection means, such as a toggle switch and/or a toggle switch and light or other indicia member. A separate button or switch for selection of reverse may be provided or reverse may be selected as a downshift from neutral. Also, neutral may be selected as an upshift from reverse or as a downshift from low.

In operation, to select upshifts and downshifts manually, the operator will depress either button 120 or button 124 as appropriate. The selected button will then be lighted until the selected shift is implemented or until the selection is cancelled.

Alternatively, at a given engine speed (such as above 1700 RPM) the upshift button may be lit and remain lit until an upshift is selected by pushing the button.

To implement a selected shift, the manifold 112 is preselected to cause actuator 70 to be biased to shift main transmission section 12 into neutral. This is accomplished by the operator or the ECU controller causing a torque reversal by manually momentarily decreasing and/or increasing the supply of fuel to the engine and/or manually or automatically disengaging the master clutch C. As the transmission is shifted into neutral, and neutral is verified by the ECU (neutral sensed for a period of time such as 1.5 seconds), the neutral condition indicia button 116 is lighted. If the selected shift is a compound shift, i.e., a shift of both the main section 12 and of the range section 14, such as a shift from 4th to 5th speeds as seen in FIG. 1A, the ECU will issue command output signals to manifold 112 to cause the auxiliary section actuator 96 to complete the range shift after neutral is sensed in the front box.

When the range auxiliary section is engaged in the proper ratio, the ECU will calculate or otherwise determine, and continue to update, an enabling range or band of input shaft speeds, based upon sensed output shaft (vehicle) speed and the ratio to be engaged, which will result in an acceptably synchronous engagement of the ratio to be engaged. As the operator or the ECU, by throttle manipulation, causes the input shaft speed to fall within the acceptable range, the ECU 106 will issue command output signals to manifold 112 to cause actuator 70 to engage the mainsection ratio to be engaged.

In the automatic preselection mode of operation, selected by use of lighted pushbutton 122, the ECU will, based upon stored logic rules, currently engaged ratio (which may be calculated by comparing input shaft to output shaft speed), output shaft or vehicle speed and/or throttle pedal position determine if an upshift or a downshift is required and preselect same. The operator is informed that an upshift or downshift is preselected and will be semi-automatically implemented by a command output signal from ECU 106 causing either lighted pushbutton 120 or lighted pushbutton 124 to flash and/or an audible shift alert signal. The operator may initiate semi-automatic implementation of the automatically preselected shift as indicated above or may cancel the automatic mode and the shift preselected thereby by depression of pushbutton 122.

Under certain operating conditions of the vehicle, an automatically or manually selected shift may not be completable, or, if completed, may not be acceptable. These conditions usually involve upshifts when the vehicle is heavy loaded and/or is traveling against a great resistance, such as in mud, up a steep grade and/or into a strong headwind. In such conditions, after a simple or a skip upshift, the torque available to the drivewheels in the target ratio may be insufficient to at least maintain vehicle speed, the vehicle will slow down, and undesirable rapid upshifting followed by immediate downshifting (i.e., "hunting") may occur.

Figure 4:
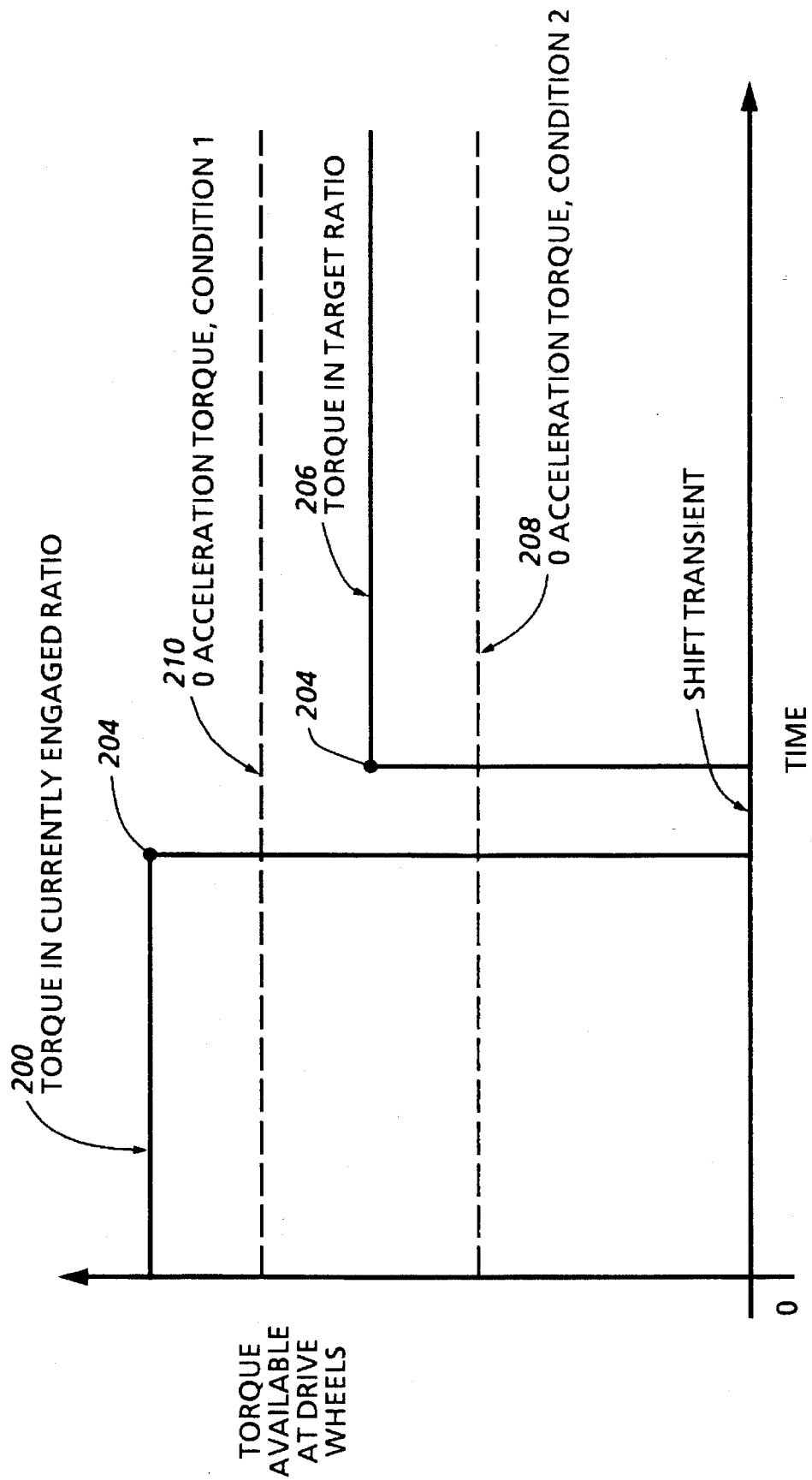
FIG. 4 is a graphical representation of an upshift event illustrating both acceptable and not acceptable attempted shifts.

The sequence of an upshift of the illustrated automated mechanical transmission system is graphically illustrated in FIG. 4. Line 200 represents the maximum torque available at the drivewheels prior to the upshift point 202. After completion of an upshift into the target ratio at point 204, the maximum torque available to the drivewheels is represented by line 206.

The torque required to maintain vehicle speed (i.e., zero acceleration) under low resistance conditions is represented by line 208 while the torque required to maintain vehicle speed under high resistance conditions is represented by line 210.

By way of illustration, in a typical diesel engine (1,000 pound foot torque) and a typical drive axle (4.11:1.0 ratio) of a heavy-duty truck, the torque available to the drivewheels in a 1.89:1 sixth gear is about 7,768 pound feet, in a 1:1.37 seventh gear is about 5,631 pound feet, and in a 1:1.0 eighth gear is about 4,110 pound feet.

Figure 3:
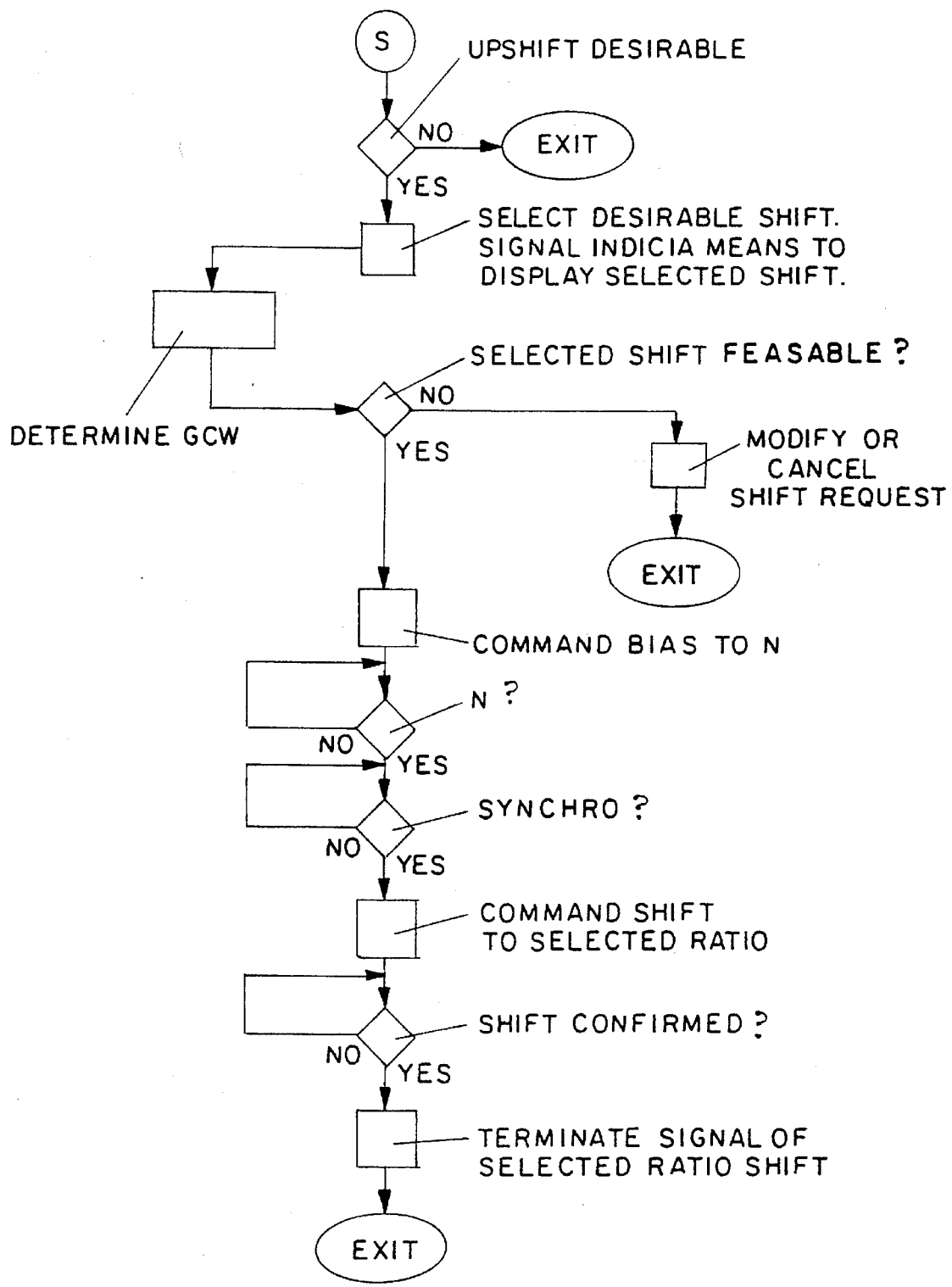
FIG. 3 is a schematic illustration, in flow chart format, of the inventive control method of the present invention.

According to the upshift control method/system of the present invention, selected upshifts are evaluated, prior to initiation thereof, to determine if acceptable or not acceptable, and not acceptable selections are either modified or cancelled. Acceptable shifts are those which will allow at least a predetermined minimum vehicle acceleration in the target ratio under existing vehicle operating conditions. The upshift sequence according to the control systems/method of the present invention is schematically illustrated, in flow chart format, in FIG. 3.

To accomplish the above, for vehicles having a widely variable GCW (i.e., combined weight of vehicle, fuel, cargo (if any), passengers (if any) and operator), the following procedure is followed. The vehicle controller will determine and memorize a value for current vehicle GCW using the control method/system of the present invention. Upon sensing that an upshift (single or skip) has been selected by the system controller shift logic, the system can determine, utilizing the current value of GCW, the current value of wheel torque and the current value of vehicle acceleration, the drivewheel torque necessary to achieve minimal acceptable vehicle acceleration (usually zero acceleration), i.e., the value of lines 208 or 210. Based upon this information and a present or learned value of engine torque and drive ratio ratings (i.e., lines 200 and 206, etc.), the ECU can then determine if, under current vehicle operating conditions, the system is able to successfully and acceptably complete the proposed shift. Based upon this information, the control system can then either (i) issue command signals to implement the proposed shift, or (ii) modify the proposed shift (usually command a single rather than a skip upshift, or (iii) cancel/prohibit the shift request for a predetermined period of time (such as, for example, about 10 seconds).

Briefly, the wheel torque $T_O$ required for zero vehicle acceleration can be approximated by the relationship:

$$T_O = T_1 - (C \cdot W \cdot A_1)$$

where:

$T_1$=drivewheel torque for vehicle acceleration 1;
C=a constant,
$A_1$=vehicle acceleration at torque setting 1, and
W=gross combined weight (GCW).

The above relationship is derived as follows:

$$T = C_1 W + C_2 V^2 + C_3 G \cdot W + C_4 (W \div g)(A)$$

where:

T=drivewheel torque;
W=gross vehicle weight;
V=vehicle velocity;
G=a factor proportional to grade;
A=current vehicle acceleration;
g=gravity constant; and
Ci=constants, related to drivetrain and engaged gear ratio and where:

$C_1 W$ represents engine torque, delivered to the drivewheels, to overcome rolling resistance;
$C_2 V^2$ represents engine torque, delivered to the drivewheels, to overcome aerodynamic drag;
$C_3 GW$ represents engine torque, delivered to the drivewheels, to overcome grade resistance; and
$C_4(W \div g) A$ represents engine torque, delivered to the drivewheels to achieve acceleration A.

A change in engine torque, from $T_1$ to $T_2$, is represented:

$$T_1 - T_2 = C_1(W-W) + C_2(V_1^2 V_2^2) + C_3 \cdot G(W-W) + C_4 W \div g(A_1 - A_2)$$

considering that:

W−W=O;

$V_1^2 - V_2^2 = O$ ($V_1$ almost equals $V_2$ at closely spaced times $t_1$ and $t_2$);
$C = C_4 \div g$, the relationship may be rewritten:

$$T_1 - T_2 = C \cdot W(A_1 - A_2),$$

or $$(T_1 - T_2) \div (A_1 \div A_2) = C \cdot W$$

Setting $A_2$ equal to zero acceleration, $$T_1 - T_2 = C \cdot W(A_1)$$

$$T_2 = T_1(C \cdot W \cdot A_1)$$

As seen from the foregoing, vehicle GCW ("W") is a variable that is useful in various vehicular automation controls, such as shiftability determination, electronically controlled braking systems, fleet management systems, intelligent vehicle/highway systems and the like, According to the present invention, a system/method is provided for accurately determining vehicular GCW using existing information from a fully or partially automated mechanical transmission system and, preferably, from an electronic engine (SAE J 1922 or J 1939 protocol) data link, It can be mathematically proven that for two times, $t_1$ and $t_2$, that are close to each other (within seconds):

$$T_1 - T_2 = C \times W \times (A_1 - A_2)$$

where:

$T_i$=Wheel torque at time $t_i$;
C=Rolling radius/gravity constant;
W=Gross combination weight; and
$A_i$=Vehicle acceleration at time $t_i$.

The proof of this relationship is as follows:

$$F = mA$$

$$F_{WHEELS} - RR - AD - GR = Accel\ R = mA$$

$$F_{WHEELS} = RR + AD + GR + Accel\ R$$

where:

RR=Rolling resistance;
AD=Aerodynamic drag;
GR=Grade resistance;
Accel R=Acceleration resistance; and
$F_{WHEELS}$=Force of road on drivewheels $$F_{WHEELS} = \text{torque at wheels} \div C_3 = \underbrace{C_1 \cdot W}_{RR} + \underbrace{C_2 \cdot V^2}_{AD} + \underbrace{\text{Grade} \cdot W}_{GR} + \underbrace{W \div g \cdot A}_{Accel\ R}$$

Multiply through by $C_3$:

$$T_w = C_4 \cdot W + C_5 \cdot V^2 + C_3 \cdot \text{Grade} \cdot W + C_3 \cdot (W \div g) \cdot A$$

At $T_1$: $T_1 = C_4 \cdot W + C_5 \cdot V_1^2 + C_3 \cdot \text{Grade} \cdot W + C_3 \cdot (W \div g) \cdot A_1$ At $T_2$: $T_2 = C_4 W + C_5 \cdot V_2^2 + C_3 \cdot \text{Grade} \cdot W + C_3 \cdot (W \div g) \cdot A_2$ Subtract second equation from first:

$$T_1 - T_2 = C_5 \cdot (V_1^2 - V_2^2) + C_3 \cdot W \div g \cdot (A_1 - A_2)$$

since $V_1 \approx V_2$, we can set $(V_1^2 - V_2^2) = 0$ If $C_3 \div g = C_6$, $T_1 - T_2 =$ $C_6 \cdot W \cdot (A_1 - A_2)$. Based upon this relationship, GCW may be determined from the expression:

$$GCW = W = (T_1 - T_2) \div ((A_1 - A_2) * C)$$

To minimize the effects of "noise" and drivetrain torsionals and the like, it is desirable that the values of T and A be obtained when a maximum magnitude of difference exists, consistant with the conditions for deriving the expression, namely, that $t_1$ and $t_2$ be relatively close in time (four seconds has been selected as a maximum time difference for heavy-duty trucks based upon actual on vehicle testing experience).

Also, to minimize errors, a plurality of GCW values is determined with GCW equaling an average:

$$GCW = \frac{\sum_{i=2}^{i} ((T_1 - T_i) \div ((A_1 - A_i) * C))}{(i-1)}$$

Figure 5:
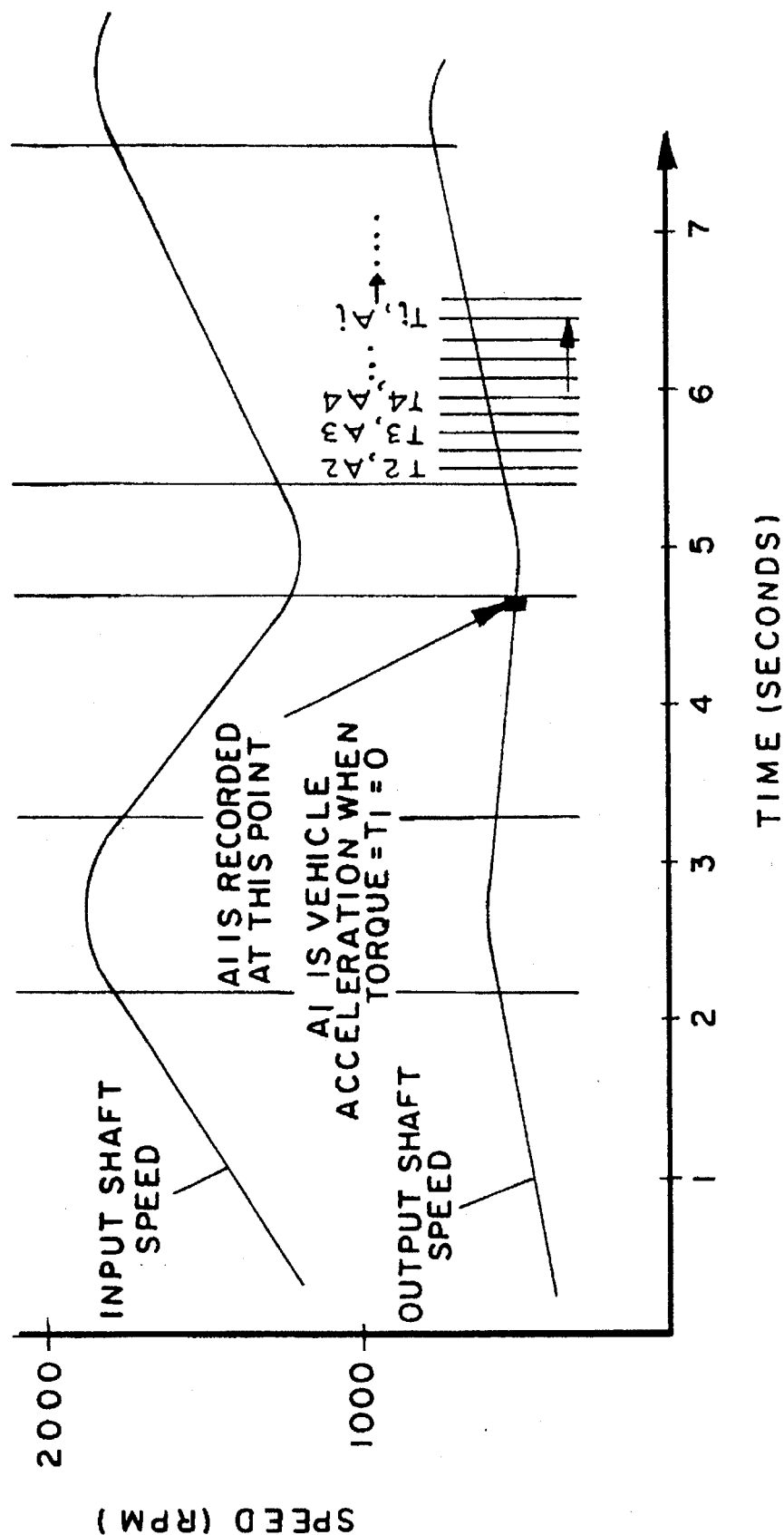
FIG. 5 is a graphical illustration of an upshift during which GCW is calculated according to the present invention.

A graphical representation of an upshift is seen in FIG. 5. It has been found that more accurate determinations of GCW may be obtained at completion of an upshift, especially if time $t_1$ is selected at the instant during an upshift immediately prior to engagement of the new ratio. At this instant, $T_1$, torque supplied from the engine to the drivewheels, is zero, and vehicle acceleration $A_1$ is a relatively low, possibly negative, value. Times $t_2, t_3 \ldots t_i$ may then be any point after engine power is sufficiently applied to the drivewheels through the vehicle powertrain for up to four seconds after time $t_1$.

In practice, a new $GCW_i$ is calculated about every 40 milliseconds after $t_2$ until about four seconds after $t_1$. The $GCW_i$ values are then summed and averaged. The averaging technique adjusts for errors in each individual iteration due to torsionals, noise and the like which may render individual iterations of GCW relatively inaccurate. When the counter reaches 1,000, the sum is divided in half, the counter set to 500, and the averaging continues. This will provide a mild filtering of the GCW value.

After time $t_1$, when the initial $A_1$ value is sensed, values of $A_2 \ldots _i$ and $T_2 \ldots _i$ will not be sensed until certain conditions are met, assuring that the subsequent values are different enough in magnitude from the time $t_1$ values to provide valid calculations for GCW. These conditions, determined from on-vehicle testing, are:

(1) $t_i$ is less than four seconds after $t_1$;

(2) the engine is operating at greater than a reference torque (about 19 percent of peak torque);

(3) vehicle acceleration is greater than a reference value (dOS/dt>about 20 RPM/sec.);

(4) input shaft speed greater than a reference value (IS>about 1,200 RPM for a heavy-duty diesel engine);

(5) vehicle acceleration has changed (dOS/dr at $t_2 \ldots _i$ ≠dOS/dr at $t_1$); and (6) a shift is not in progress.

In practice, to get $T_i$, the drivewheel torque at time $t_i$, the engine torque is sensed, preferably from the electronic data link DL, and used to derive the drivewheel torque in a known manner. Generally, torque at wheels may be determined from the following:

Torque at wheels=(engine torque)*(gear ratio)*(axle ratio)*(drivetrain efficiency);

where engine torque=[(percent engine torque)* (peak engine torque)]−[(torque to drive vehicle accessories)+ (torque to accelerate engine)]

Accordingly, signals indicative of engine torque and of transmission gear ratio are signals indicative of drivewheel torque. While engine torque from readings from the data link DL is preferred, engine torque also may be determined/ estimated from throttle position signals or the like.

Figure 6:
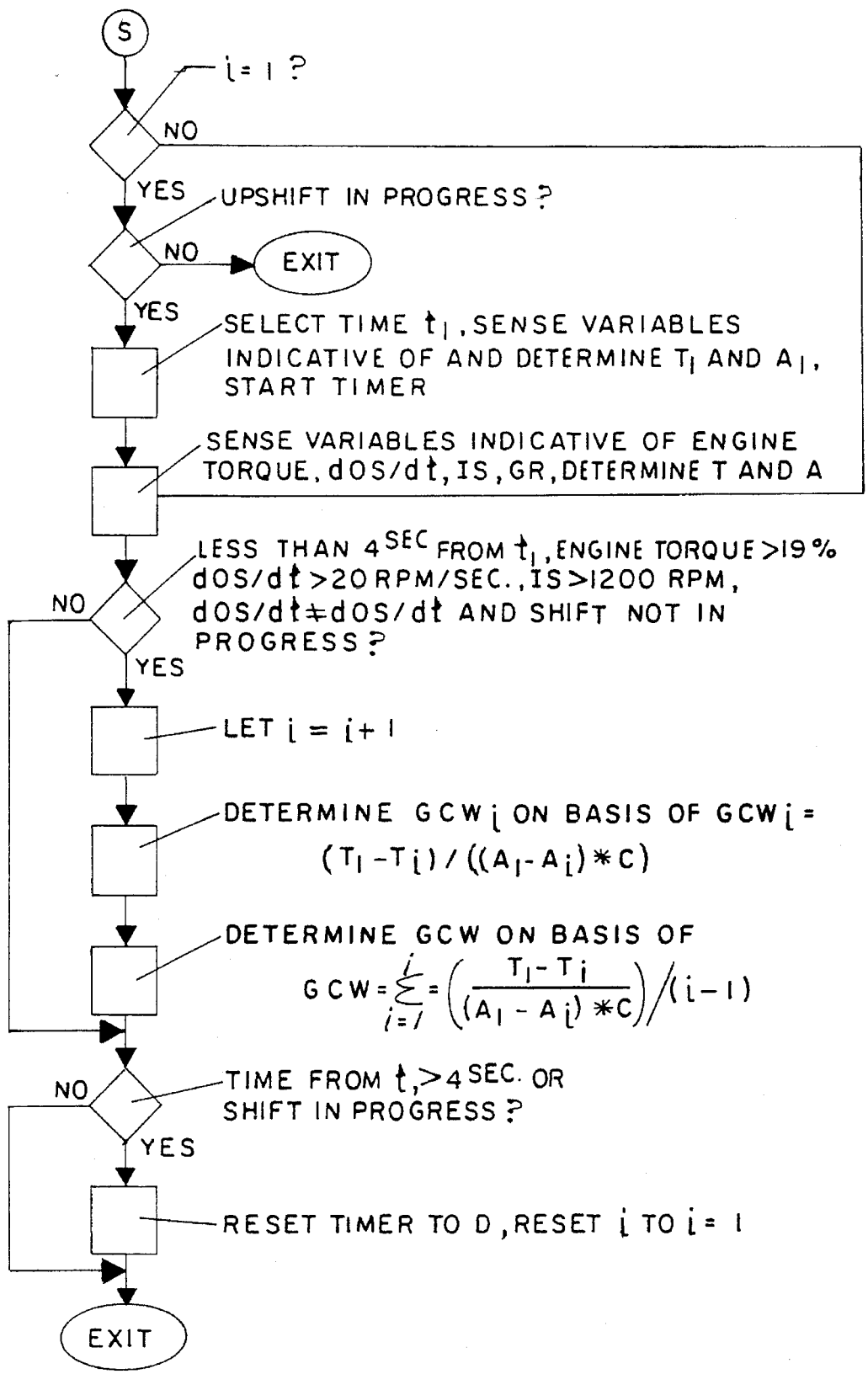
FIG. 6 is a schematic illustration, in flow chart format, of the GCW determination control method of the present invention.

FIG. 6 is a flow chart representation of the process of the present invention by which vehicular GCW is determined.

Although the present invention has been described with a certain degree of particularity, it is understood that various changes to form and detail may be made without departing from the spirit and the scope of the invention as hereinafter claimed.

I claim:

1. A control method including determination of an updated value indicative of vehicular gross combination weight (GCW) in a vehicle having an at least partially automated mechanical transmission system, including a fuel-controlled engine, a multiple-speed change-gear transmission having a plurality of known gear ratios, an input shaft drivingly connectable to the engine and an output shaft drivingly connectable to vehicular drivewheels, first sensor means for providing an input signal indicative of drive torque to the drivewheels, second sensor means for providing an input signal indicative of vehicular acceleration and control means for receiving said input signals and processing same according to predetermined logic rules to issue command output signals to system actuators, said method comprising:

determining a value indicative of current drivewheel torque (T);

determining a value indicative of current vehicle acceleration (A); and determining, only immediately after an upshift into a target gear ratio, said updated value indicative of current vehicular gross combination weight ($GCW_i$) as a function of the expression:

$$(T_1 - T_i) \div ((A_1 - A_i) * C)$$

where:

i=an integer greater than 1;

$T_1$=a value indicative of wheel torque at time $t_1$ selected as a time immediately prior to engagement of the target gear ratio;

$T_1$=0;

$T_i$=a value indicative of wheel torque at time $t_i$≠0;

$A_1$=a value indicative of vehicle acceleration at time $t_1$ selected as a time immediately prior to engagement of the target gear ratio;

$A_i$=a value indicative of vehicle acceleration at time $t_i$;

C=constant related to gear ratio, drivetrain characteristics and gravity; and time $t_i$ is less than a reference time ($REF_{TIME}$) after time $t_2$; and controlling shifting of said transmission system as a function of said updated value.

2. The method of claim 1 wherein said updated value is determined only if vehicle acceleration exceeds an acceleration reference value ($REF_{ACCEL}$).

3. The method of claim 2 wherein output shaft speed (OS) is the input signal indicative of vehicle acceleration, and the acceleration reference value requires that dOS/dt>20 RPM/ second.

4. The method of claim 1 wherein said updated value determination is terminated if a shift from the target gear ratio is initiated.

5. The method of claim 1 wherein said transmission system further includes third sensing means for providing an input signal indicative of input shaft speed, and said updated value is determined only if input shaft speed (IS) exceeds an input shaft speed reference value ($REF_{IS}$).

6. The method of claim 5 wherein said input shaft speed reference value ($REF_{IS}$) equals about 1,200 RPM.

7. The method of claim 1 wherein a signal indicative of engine torque is the signal indicative of drivewheel torque.

8. The method of claim 7 wherein said updated value is determined only if engine torque exceeds an engine torque reference value ($REF_{ET}$).

9. The method of claim 8 wherein said engine has a known peak torque and said engine torque reference value equals about 19 percent of peak engine torque.

10. The method of claims 1, 2, 5 or 8 wherein said reference time ($REF_{TIME}$) equals about four seconds.

11. The method of claim 1 wherein an average value of GCW is determined by:

repeatedly, periodically determining the current value of $GCW_i$; and determining a value indicative of the average value of vehicular GCW as a function of the expression:

$$GCW = \frac{\sum_{i=2}^{i} ((T_1 - T_i) \div ((A_1 - A_i) * C))}{(i-1)}$$

12. The method of claim 11 wherein said summation is restarted upon engine restart and upon engine idle over an extended period of time.

13. The method of claim 11 wherein after summation of a predetermined number of determinations of $GCW_i$, said summation value and the value of i are reduced by a predetermined percentage, and said summation and averaging process will continue.

14. A control method including determination of an updated value indicative of vehicular gross combination weight (GCW) in a vehicle having an at least partially automated mechanical transmission system, including a fuel-controlled engine, a multiple-speed change-gear transmission having a plurality of known gear ratios, an input shaft drivingly connectable to the engine and an output shaft drivingly connectable to vehicular drivewheels, first sensor means for providing an input signal indicative of drive torque to the drivewheels, second sensor means for providing an input signal indicative of vehicular acceleration and a controller for receiving said input signals and processing same according to predetermined logic rules to issue command output signals to system actuators, said method comprising:

determining a value indicative of current drivewheel torque (T);

determining a value indicative of current vehicle acceleration (A); and determining, only immediately after an upshift into a target gear ratio, said updated value indicative of current vehicle gross combination weight ($GCW_i$) as a function of the expression:

$$(T_1-T_i) \div ((A_1-A_i)* C)$$

where:

i=an integer greater than 1;

$T_1$=a value indicative of wheel torque at time $t_1$ selected as a time immediately prior to engagement of the target gear ratio;

a value indicative of wheel torque at time $t_i \approx T_1$;

a value indicative of vehicle acceleration at time $t_1$ selected as a time immediately prior to engagement of the target gear ratio;

$A_i$=a value indicative of vehicle acceleration at time $t_i$;

C=constant related to gear ratio, drivetrain characteristics and gravity; and time $t_i$ is less than a reference time ($REF_{TIME}$) after time $t_1$; and controlling shifting of said transmission system as a function of said updated value.

15. The method of claims 1, 2, 3, 4, 5, 8, 11, or 14 further comprising:

issuing command output signals to at least one of said system actuators as a function of said updated value.

16. A control system including determining an updated value indicative of vehicular gross combination weight (GCW) and for controlling an onboard vehicle mechanism as a function thereof in a vehicle having an at least partially automated mechanical transmission system, including a fuel-controlled engine, a multiple-speed change-gear transmission having a plurality of known gear ratios, an input shaft drivingly connectable to the engine and an output shaft drivingly connectable to vehicular drivewheels, first sensor means for providing an input signal indicative of drive torque to the drivewheels, second sensor means for providing an input signal indicative of vehicular acceleration and a control means for receiving said input signals and processing same according to predetermined logic rules to issue command output signals to system actuators, said system comprising:

means for determining a value indicative of current drivewheel torque (T);

means for determining a value indicative of current vehicle acceleration (A);

means for determining, only immediately after an upshift into a target gear ratio, said updated value indicative of current vehicle gross combination weight ($GCW_i$) as a function of the expression:

$$(T_1-T_i) \div ((A_1-A_i)* C)$$

where:

i=an integer greater than 1;

$T_1$=a value indicative of wheel torque at time $t_1$ selected as a time immediately prior to engagement of the target gear ratio;

$T_1=0$;

$T_i$=a value indicative of wheel torque at time $t_i \neq 0$;

$A_1$=a value indicative of vehicle acceleration at time $t_i$ selected as a time immediately prior to engagement of the target gear ratio;

$A_i$=a value indicative of vehicle acceleration at time $t_i$;

C=constant related to gear ratio, drivetrain characteristics and gravity;

time $t_i$ is less than a reference time ($REF_{TIME}$) after time $t_1$;

means for controlling shifting of said transmission system as a function of said updated value; and means for issuing command output signals to at least one of said system actuators as a function of said updated value.

17. The system of claim 16 wherein said updated value is determined only if vehicle acceleration exceeds an acceleration reference value ($REF_{ACCEL}$).

18. The system of claim 16 wherein said updated value determination is terminated if a shift from the target gear ratio is initiated.

19. The system of claim 16 wherein said transmission system further includes third sensing means for providing an input signal indicative of input shaft speed, and said updated value is determined only if input shaft speed (IS) exceeds an input shaft speed reference value ($REF_{IS}$).

20. The system of claim 16 wherein a signal indicative of engine torque is the signal indicative of drivewheel torque.

21. The system of claim 20 wherein said updated value is determined only if engine torque exceeds as engine torque reference value ($REF_{ET}$).

22. The system of claim 16 wherein said reference time ($REF_{TIME}$) equals about four seconds.

23. The system of claim 16 wherein an average value of GCW is determined by:

means for repeatedly, periodically determining the current updated value indicative of $GCW_i$; and means for determining a value indicative of the average value of vehicular GCW as a function of the expression:

$$GCW = \frac{\sum_{i=2}^{i}((T_1 - T_i) \div ((A_1 - A_i) * C))}{(i-1)}$$

24. A control system including determining an updated value indicative of vehicular gross combination weight (GCW) in a vehicle having an at least partially automated mechanical transmission system, including a fuel-controlled engine, a multiple-speed change-gear transmission having a plurality of known gear ratios, an input shaft drivingly connectable to the engine and an output shaft drivingly connectable to vehicular drivewheels, first sensor means for providing an input signal indicative of drive torque to the drivewheels, second sensor means for providing an input signal indicative of vehicular acceleration and a controller for receiving said input signals and processing same according to predetermined logic rules to issue command output signals to system actuators, said controller having a memory for storing logic rules:

for determining a value indicative of current drivewheel torque (T);

for determining a value indicative of current vehicle acceleration (A);

for determining, only immediately after an upshift into a target gear ratio, said value indicative of $GCW_i$ as a function of the expression:

$$(T_1 - T_i) \div ((A_1 - A_i) * C)$$

where:

i=an integer greater than 1;

$T_1$=a value indicative of wheel torque at time $t_1$ selected as a time immediately prior to engagement of the target gear ratio;

$T_i$=a value indicative of wheel torque at time $t_i \neq T_1$;

$A_1$=a value indicative of vehicle acceleration at time $t_1$ selected as a time immediately prior to engagement of the target gear ratio;

$A_i$=a value indicative of vehicle acceleration at time $t_i$;

C=constant related to gear ratio, drivetrain characteristics and gravity;

time $t_i$ is less than a reference time ($REF_{TIME}$) after time $t_1$;

for controlling shifting of said transmission system as a function of said updated value; and for issuing command output signals to at least one of said system actuators as a function of said updated value.

25. A control method for controlling at least partially automated implementation of selected shifts of a vehicular mechanical change gear transmission system comprising a controlled fuel throttle controlled engine (E) having a determined torque capacity, a multi-speed change gear mechanical transmission (10) having a plurality of known gear ratios, an input shaft (16) and an output shaft (90) adapted to drive vehicular drive wheels, a first sensor (98) for providing a first input signal indicative of transmission input shaft (16) rotational speed, a second sensor (100) for providing a second input signal indicative of vehicle speed, a third sensor (DL) for providing an input signal indicative of engine torque, means for differentiating said second signal with respect to time to determine a fourth signal indicative of current vehicle acceleration, and a transmission actuator (112, 70, 96) for controlling shifting of the transmission, said control method including:

predetermining a minimum acceptable vehicle acceleration ($A_{MIN}$) after an upshift;

determining, only immediately after an upshift into a target gear ratio, a value indicative of $GCW_i$ as a function of the expression:

$$(T_1 - T_i) \div (A_1 - A_i) * C)$$

where:

i=an integer greater than 1:

$T_1$=a value indicative of wheel torque at time $t_1$ selected as a time immediately prior to engagement of the target gear ratio;

$T_1$=0;

$T_i$=a value indicative of wheel torque at time $t_i \neq 0$;

$A_1$=a value indicative of vehicle acceleration at time $t_i$ selected as a time immediately prior to engagement of the target gear ratio;

$A_i$=a value indicative of vehicle acceleration at time $t_i$;

C=a constant related to gear ration, drivetrain characteristics and gravity; and time $t_i$ is less than a reference time ($REF_{TIME}$) after time $t_i$;

determining the desirability of an upshift from a currently engaged transmission ratio to a target transmission ratio;

determining an expected required drivewheel torque ($T_{REQ}$) to maintain at least said minimum vehicle acceleration ($A_{MIN}$) under current vehicle operating conditions, as a function of said GCW;

determining as a function of (i) the expected required drivewheel torque ($T_{REQ}$) to maintain at least said minimum vehicle acceleration ($A_{MIN}$) under current vehicle operating conditions, (ii) the gear ratio of the selected target gear ratio and (iii) the expected maximum available torque to the drivewheels in the target transmission ratio, if said expected maximum available torque will at least equal said expected required drivewheel torque upon engagement of the target transmission ratio if the selected shift is implemented; and controlling said transmission by causing the initiation of a selected upshift only upon a determination of that said maximum available torque will at least equal said expected required drivewheel torque upon engagement of the target transmission ratio.

26. The method of claim 25 wherein $T_{REQ}$ is determined as a function of the expression:

$$T_O = T_1 - (C \cdot W \cdot A_1)$$

where:
- $T_1$ = a value representative of drivewheel torque for vehicle acceleration 1;
- a value representative of vehicle acceleration at drivewheel torque setting 1;
- W = a value representative of GCW; and
- C = a constant;

27. The method of claim 25 wherein $GCW_i$ is determined only if vehicle acceleration exceeds an acceleration reference value ($REF_{ACCEL}$).

28. The method of claim 25 wherein $GCW_i$ determination is terminated if a shift from the target gear ratio is initiated.

29. The method of claim 25 wherein a signal indicative of engine torque is the signal indicative of drivewheel torque.

30. The method of claim 25 wherein $GCW_i$ is determined only if engine torque exceeds an engine torque reference value ($REF_{ET}$).

31. The method of claim 30 wherein said engine torque reference value equals about 19 percent of peak engine torque.

32. The method of claim 25 or 26 wherein said reference time ($REF_{TIME}$) equals about four seconds.

33. The method of claims 25 or 26 wherein an average value of GCW is determined by:

repeatedly, periodically determining the current value of $GCW_i$; and determining a value indicative of the average value of vehicular GCW as a function of the expression:

$$GCW = \frac{\sum_{i=2}^{i} ((T_1 - T_i) + ((A_1 - A_i) * C))}{(i-1)}$$

* * * * *